(12) United States Patent
Akerib

(10) Patent No.: US 10,846,365 B2
(45) Date of Patent: *Nov. 24, 2020

(54) SPARSE MATRIX MULTIPLICATION IN ASSOCIATIVE MEMORY DEVICE

(71) Applicant: GSI Technology Inc., Sunnyvale, CA (US)

(72) Inventor: Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,458

(22) Filed: Nov. 25, 2019

(65) Prior Publication Data

US 2020/0097521 A1    Mar. 26, 2020

Related U.S. Application Data

(63) Continuation of application No. 15/873,002, filed on Jan. 17, 2018, now Pat. No. 10,489,480.

(60) Provisional application No. 62/449,036, filed on Jan. 22, 2017.

(51) Int. Cl.
*G06F 17/16* (2006.01)

(52) U.S. Cl.
CPC .................. *G06F 17/16* (2013.01)

(58) Field of Classification Search
None
See application file for complete search history.

(56) References Cited

U.S. PATENT DOCUMENTS

| | | | | | |
|---|---|---|---|---|---|
| 5,014,327 | A | * | 5/1991 | Potter | G06K 9/6276 382/220 |
| 5,206,822 | A | * | 4/1993 | Taylor | G06F 9/383 708/607 |
| 5,216,822 | A | * | 6/1993 | Madiedo | A45D 20/12 34/82 |
| 8,238,173 | B2 | * | 8/2012 | Akerib | G11C 15/043 365/189.15 |
| 9,418,719 | B2 | * | 8/2016 | Akerib | G11C 8/10 |
| 9,558,156 | B1 | * | 1/2017 | Bekas | G06F 17/16 |
| 9,558,812 | B2 | * | 1/2017 | Akerib | G11C 11/419 |
| 10,489,480 | B2 | * | 11/2019 | Akerib | G06F 17/16 |
| 2015/0131383 | A1 | * | 5/2015 | Akerib | G11C 16/10 365/185.18 |
| 2015/0199266 | A1 | * | 7/2015 | Franchetti | G06F 15/7821 711/117 |

(Continued)

*Primary Examiner* — Andrew Caldwell
*Assistant Examiner* — Emily E Larocque
(74) *Attorney, Agent, or Firm* — Heidi Brun Associates Ltd.

(57) ABSTRACT

A method for use in an associative memory device when multiplying by a sparse matrix includes storing only non-zero elements of the sparse matrix in the associative memory device as multiplicands. The storing includes locating the non-zero elements in computation columns of the associative memory device according to linear algebra rules along with their associated multiplicands such that a multiplicand and a multiplier of each multiplication operation to be performed are stored in a same computation column. The locating locates one of the non-zero elements in more than one computation column if one of the non-zero elements is utilized in more than one multiplication operation.

8 Claims, 22 Drawing Sheets

(56) References Cited

U.S. PATENT DOCUMENTS

| | | | | |
|---|---|---|---|---|
| 2016/0140084 A1* | 5/2016 | Daga | ............... | G06F 17/16 |
| | | | | 708/207 |
| 2016/0179750 A1* | 6/2016 | Zhou | ............... | G06F 17/16 |
| | | | | 708/203 |
| 2016/0224465 A1* | 8/2016 | Morad | ............... | G06F 9/3887 |
| 2017/0316829 A1* | 11/2017 | Ehrman | ............... | G11C 7/18 |
| 2018/0210862 A1* | 7/2018 | Akerib | ............... | G06F 17/16 |
| 2018/0275909 A1* | 9/2018 | Agrawal | ............... | G06F 7/00 |
| 2019/0042237 A1* | 2/2019 | Azizi | ............... | G06F 9/3802 |

* cited by examiner

120C

|  | Col-1 | Col-2 | Col-3 | Col-4 |
|---|---|---|---|---|
| M-val | 3 | 5 | 9 | 17 |
| C-indx |  |  |  |  |
| R-indx |  |  |  |  |
| V-val | -2 | 3 | -1 | -1 |
| Prod | -6 | 15 | -9 | -17 |

702 — Prod

|  | Col-1 | Col-2 | Col-3 | Col-4 |
|---|---|---|---|---|
| M-val |  |  |  |  |
| C-indx | 1 | ② | ② | 4 |
| R-indx |  |  |  |  |
| V-val |  |  |  |  |
| Prod | -6 | ⑮ | ⊖-9 | -17 |
| Out | -6 | 6 | 0 | -17 |

|   | 1 | 2 | 3 | 4  |
|---|---|---|---|----|
| 1 | 0 | 0 | 0 | 0  |
| 2 | 3 | 0 | 0 | 0  |
| 3 | 0 | 5 | 0 | 0  |
| 4 | 0 | 9 | 0 | 17 |

Mem-M1

|       | Col-1 | Col-2 | Col-3 | Col-4 |
|-------|-------|-------|-------|-------|
| M-val | 3     | 5     | 9     | 17    |
| C-indx| 1     | 2     | 2     | 4     |
| R-indx| 2     | 3     | 4     | 4     |

M2

|   | 1 | 2 | 3 | 4 |
|---|---|---|---|---|
| 1 | 0 | 1 | 0 | 2 |
| 2 | 0 | 0 | 0 | 0 |
| 3 | 0 | 0 | 6 | 0 |
| 4 | 0 | 3 | 0 | 0 |

Mem-M2

|       | Col-1 | Col-2 | Col-3 | Col-4 |
|-------|-------|-------|-------|-------|
| M-val | 1     | 6     | 3     | 2     |
| C-indx| 2     | 3     | 2     | 4     |
| R-indx| 1     | 3     | 4     | 1     |

M3

|   | 1 | 2  | 3 | 4  |
|---|---|----|---|----|
| 1 | 3 | 18 | 0 | 34 |
| 2 | 0 | 0  | 0 | 0  |
| 3 | 0 | 30 | 0 | 0  |
| 4 | 9 | 0  | 0 | 0  |

Mem-M3

|       | Col-1 | Col-2 | Col-3 | Col-4 | Col-5 |
|-------|-------|-------|-------|-------|-------|
| M-val | 3     | 18    | 34    | 30    | 9     |
| C-indx| 1     | 2     | 4     | 2     | 1     |
| R-indx| 1     | 1     | 1     | 3     | 4     |

FIG. 10

|  | Mem-M1 | | | |
| --- | --- | --- | --- | --- |
|  | Col-1 | Col-2 | Col-3 | Col4 |
| Val-M1 | 1 | 6 | 3 | 2 |
| C-indx | 2 | 3 | 2 | 4 |
| R-indx | 1 | 3 | 4 | 1 |
| Mark |  |  |  |  |

|  | Mem-M2 | | | |
| --- | --- | --- | --- | --- |
|  | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 |  |  |  |  |
| Prod |  |  |  |  |
| Out |  |  |  |  |

FIG. 12

|  | Mem-M1 | | | |
| --- | --- | --- | --- | --- |
|  | Col-1 | Col-2 | Col-3 | Col4 |
| Val-M1 | 1 | 6 | 3 | 2 |
| C-indx | 2 | 3 | 2 | 4 |
| R-indx | ①  | 3 | 4 | 1 |
| Mark |  |  |  |  |

|  | Mem-M2 | | | |
| --- | --- | --- | --- | --- |
|  | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 |  |  |  |  |
| Prod |  |  |  |  |
| Out |  |  |  |  |

FIG. 13

|  | Mem-M1 | | | |
| --- | --- | --- | --- | --- |
|  | Col-1 | Col-2 | Col-3 | Col4 |
| Val-M1 | 1 | 6 | 3 | 2 |
| C-indx | 2 | 3 | 2 | 4 |
| R-indx | ① | 3 | 4 | ① |
| Mark | ⊗ |  |  | ⊗ |

|  | Mem-M2 | | | |
| --- | --- | --- | --- | --- |
|  | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 |  |  |  |  |
| Prod |  |  |  |  |
| Out |  |  |  |  |

| Mem-M1 | Col-1 | Col-2 | Col-3 | Col4 |
|---|---|---|---|---|
| Val-M1 | 1 | 6 | 3 | 2 |
| C-indx | ② | 3 | 2 | 4 |
| R-indx | 1 | 3 | 4 | 1 |
| Mark | | | | |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | | | | |
| Prod | | | | |
| Out | | | | |

FIG. 16

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | | | | |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | ② | 3 | 4 | 4 |
| Val-M1 | | | | |
| Prod | | | | |
| Out | | | | |

FIG. 17

| Mem-M1 | Col-1 | Col-2 | Col-3 | Col4 |
|---|---|---|---|---|
| Val-M1 | ① | 6 | 3 | 2 |
| C-indx | 2 | 3 | 2 | 4 |
| R-indx | 1 | 3 | 4 | 1 |
| Mark | Y | | | X |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | ① | | | |
| Prod | | | | |
| Out | | | | |

| | Mem-M1 | | | |
|---|---|---|---|---|
| | Col-1 | Col-2 | Col-3 | Col4 |
| Val-M1 | 1 | 6 | 3 | 2 |
| C-indx | 2 | 3 | 2 | ④ |
| R-indx | 1 | 3 | 4 | 1 |
| Mark | Y | | | X |

| | Mem-M2 | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 | 1 | | | |
| Prod | | | | |
| Out | | | | |

FIG. 18

| | Mem-M1 | | | |
|---|---|---|---|---|
| | Col-1 | Col-2 | Col-3 | Col4 |
| Val-M1 | 1 | 6 | 3 | 2 |
| C-indx | 2 | 3 | 2 | 4 |
| R-indx | 1 | 3 | 4 | 1 |
| Mark | Y | | | X |

| | Mem-M2 | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | ④ | ④ |
| Val-M1 | 1 | | | |
| Prod | | | | |
| Out | | | | |

FIG. 19

| | Mem-M1 | | | |
|---|---|---|---|---|
| | Col-1 | Col-2 | Col-3 | Col4 |
| Val-M1 | 1 | 6 | 3 | ② |
| C-indx | 2 | 3 | 2 | 4 |
| R-indx | 1 | 3 | 4 | 1 |
| Mark | Y | | | Y |

| | Mem-M2 | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 | 1 | | ② | ② |
| Prod | | | | |
| Out | | | | |

FIG. 20

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | Y |  |  | Y |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | 1 |  | 2 | 2 |
| Prod | 3 |  | 18 | 34 |
| Out | 3 |  | 18 | 34 |

FIG. 21

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | Y |  |  | Y |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | 1 |  | 2 | 2 |
| Prod | 3 |  | 18 | 34 |
| Out | 3 |  | 18 | 34 |

| Mem-M3 | Col-1 | Col-2 | Col-3 |
|---|---|---|---|
| Val-M1 | 3 | 18 | 34 |
| C-indx | 1 | 2 | 4 |
| R-indx | 1 | 1 | 1 |

| Mem-M1 | | | | |
|---|---|---|---|---|
| | Col-1 | Col-2 | Col-3 | Col4 |
| Val-M1 | 1 | 6 | 3 | 2 |
| C-indx | 2 | 3 | 2 | 4 |
| R-indx | 1 | 3 | 4 | 1 |
| Mark | Y | | | Y |

| Mem-M2 | | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 | | | | |
| Prod | | | | |
| Out | | | | |

FIG. 24

| Mem-M1 | | | | |
|---|---|---|---|---|
| | Col-1 | Col-2 | Col-3 | Col4 |
| Val-M1 | 1 | 6 | 3 | 2 |
| C-indx | 2 | 3 | 2 | 4 |
| R-indx | 1 | 3 | 4 | 1 |
| Mark | Y | | | Y |

| Mem-M2 | | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 | | | | |
| Prod | | | | |
| Out | | | | |

FIG. 25

| Mem-M1 | | | | |
|---|---|---|---|---|
| | Col-1 | Col-2 | Col-3 | Col4 |
| Val-M1 | 1 | 6 | 3 | 2 |
| C-indx | 2 | 3 | 2 | 4 |
| R-indx | 1 | 3 | 4 | 1 |
| Mark | Y | X | | Y |

| Mem-M2 | | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 | | | | |
| Prod | | | | |
| Out | | | | |

| Mem-M1 | | | | |
|---|---|---|---|---|
| | Col-1 | Col-2 | Col-3 | Col4 |
| Val-M1 | 1 | 6 | 3 | 2 |
| C-indx | 2 | ③ | 2 | 4 |
| R-indx | 1 | 3 | 4 | 1 |
| Mark | Y | X | | Y |

| Mem-M2 | | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 | | | | |
| Prod | | | | |
| Out | | | | |

FIG. 26

| Mem-M1 | | | | |
|---|---|---|---|---|
| | Col-1 | Col-2 | Col-3 | Col4 |
| Val-M1 | 1 | 6 | 3 | 2 |
| C-indx | 2 | 3 | 2 | 4 |
| R-indx | 1 | 3 | 4 | 1 |
| Mark | Y | X | | Y |

| Mem-M2 | | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | ③ | 4 | 4 |
| Val-M1 | | | | |
| Prod | | | | |
| Out | | | | |

FIG. 27

| Mem-M1 | | | | |
|---|---|---|---|---|
| | Col-1 | Col-2 | Col-3 | Col4 |
| Val-M1 | 1 | ⑥ | 3 | 2 |
| C-indx | 2 | 3 | 2 | 4 |
| R-indx | 1 | 3 | 4 | 1 |
| Mark | Y | Y | | Y |

| Mem-M2 | | | | |
|---|---|---|---|---|
| | Col-1 | Col-2 | Col-3 | Col4 |
| Val-M2 | 3 | 5 | 9 | 17 |
| C-indx | 1 | 2 | 2 | 4 |
| R-indx | 2 | 3 | 4 | 4 |
| Val-M1 | | ⑥ | | |
| Prod | | | | |
| Out | | | | |

FIG. 28

Mem-M1

|        | Col-1 | Col-2 | Col-3 | Col4 |
|--------|-------|-------|-------|------|
| Val-M1 | 1     | 6     | 3     | 2    |
| C-indx | 2     | 3     | 2     | 4    |
| R-indx | 1     | 3     | 4     | 1    |
| Mark   | Y     | Y     |       | Y    |

Mem-M2

|        | Col-1 | Col-2 | Col-3 | Col4 |
|--------|-------|-------|-------|------|
| Val-M2 | 3     | 5     | 9     | 17   |
| C-indx | 1     | 2     | 2     | 4    |
| R-indx | 2     | 3     | 4     | 4    |
| Val-M1 | 3     | 6     |       |      |
| Prod   | 9     | 30    |       |      |
| Out    |       | 30    |       |      |

FIG. 29

Mem-M1

|        | Col-1 | Col-2 | Col-3 | Col4 |
|--------|-------|-------|-------|------|
| Val-M1 | 1     | 6     | 3     | 2    |
| C-indx | 2     | 3     | 2     | 4    |
| R-indx | 1     | 3     | 4     | 1    |
| Mark   | Y     | Y     |       | Y    |

Mem-M2

|        | Col-1 | Col-2 | Col-3 | Col4 |
|--------|-------|-------|-------|------|
| Val-M2 | 3     | 5     | 9     | 17   |
| C-indx | 1     | 2     | 2     | 4    |
| R-indx | 2     | 3     | 4     | 4    |
| Val-M1 | 1     | 6     | 2     | 2    |
| Prod   | 9     | 30    |       |      |
| Out    |       | 30    |       |      |

Mem-M3

|        | Col-1 | Col-2 | Col-3 | Col-4 | Col-5 |
|--------|-------|-------|-------|-------|-------|
| Val-M1 | 3     | 18    | 34    | 30    | 9     |
| C-indx | 1     | 2     | 4     | 2     | 1     |
| R-indx | 1     | 1     | 1     | 3     | 4     |
|        |       |       |       |       |       |

FIG. 30

|         | Mem-M1 |       |       |      |
|---------|--------|-------|-------|------|
|         | Col-1  | Col-2 | Col-3 | Col4 |
| Val-M1  | 1      | 6     | 3     | 2    |
| C-indx  | 2      | 3     | 2     | 4    |
| R-indx  | 1      | 3     | 4     | 1    |
| Mark    | Y      | Y     |       | Y    |

|         | Mem-M2 |       |       |      |
|---------|--------|-------|-------|------|
|         | Col-1  | Col-2 | Col-3 | Col4 |
| Val-M2  | 3      | 5     | 9     | 17   |
| C-indx  | 1      | 2     | 2     | 4    |
| R-indx  | 2      | 3     | 4     | 4    |
| Val-M1  |        |       |       |      |
| Prod    |        |       |       |      |
| Out     |        |       |       |      |

FIG. 31

|         | Mem-M1 |       |       |      |
|---------|--------|-------|-------|------|
|         | Col-1  | Col-2 | Col-3 | Col4 |
| Val-M1  | 1      | 6     | 3     | 2    |
| C-indx  | 2      | 3     | 2     | 4    |
| R-indx  | 1      | 3     | (4)   | 1    |
| Mark    | Y      | Y     |       | Y    |

|         | Mem-M2 |       |       |      |
|---------|--------|-------|-------|------|
|         | Col-1  | Col-2 | Col-3 | Col4 |
| Val-M2  | 3      | 5     | 9     | 17   |
| C-indx  | 1      | 2     | 2     | 4    |
| R-indx  | 2      | 3     | 4     | 4    |
| Val-M1  |        |       |       |      |
| Prod    |        |       |       |      |
| Out     |        |       |       |      |

FIG. 32

|         | Mem-M1 |       |       |      |
|---------|--------|-------|-------|------|
|         | Col-1  | Col-2 | Col-3 | Col4 |
| Val-M1  | 1      | 6     | 3     | 2    |
| C-indx  | 2      | 3     | 2     | 4    |
| R-indx  | 1      | 3     | (4)   | 1    |
| Mark    | Y      | Y     | (X)   | Y    |

|         | Mem-M2 |       |       |      |
|---------|--------|-------|-------|------|
|         | Col-1  | Col-2 | Col-3 | Col4 |
| Val-M2  | 3      | 5     | 9     | 17   |
| C-indx  | 1      | 2     | 2     | 4    |
| R-indx  | 2      | 3     | 4     | 4    |
| Val-M1  |        |       |       |      |
| Prod    |        |       |       |      |
| Out     |        |       |       |      |

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | Y | Y | X | Y |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | | | | |
| Prod | | | | |
| Out | | | | |

FIG. 35

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | Y | X | | Y |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | | | | |
| Prod | | | | |
| Out | | | | |

FIG. 36

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | Y | Y | | Y |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | 3 | | | |
| Prod | | | | |
| Out | | | | |

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | Y | X |  | Y |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | 3 |  |  |  |
| Prod | 9 |  |  |  |
| Out |  |  |  |  |

FIG. 37

| Mem-M1 | Col-1 | Col-2 | Col-3 | Col4 |
|---|---|---|---|---|
| Val-M1 | 1 | 6 | 3 | 2 |
| C-indx | 2 | 3 | 2 | 4 |
| R-indx | 1 | 3 | 4 | 1 |
| Mark | Y |  |  | Y |

| Mem-M2 | Col-1 | Col-2 | Col-3 | Col4 |
|---|---|---|---|---|
| Val-M2 | 3 | 5 | 9 | 17 |
| C-indx | 1 | 2 | 2 | 4 |
| R-indx | 2 | 3 | 4 | 4 |
| Val-M1 | 1 | 6 | 2 | 2 |
| Prod | 9 |  |  |  |
| Out |  |  |  |  |

| Mem-M3 | Col-1 | Col-2 | Col-3 | Col-4 | Col-5 |
|---|---|---|---|---|---|
| Val-M1 | 3 | 18 | 34 | 30 | 9 |
| C-indx | 1 | 2 | 4 | 2 | 1 |
| R-indx | 1 | 1 | 1 | 3 | 4 |

FIG. 38

| Mem-V1 | | |
|---|---|---|
| | Col-1 | Col-2 |
| Val-V1 | 1 | 3 |
| indx | ② | 4 |

| Mem-M4 | | |
|---|---|---|
| | Col-1 | Col-2 |
| Row-1 | 0 | 6 |
| Row-② | ④ | -② |
| Row-3 | 1 | 5 |
| Row-4 | -1 | 2 |
| Val-V1 | ① | ① |
| Prod 1 | ④ | -② |
| Prod 2 | | |

FIG. 41

| Mem-V1 | | |
|---|---|---|
| | Col-1 | Col-2 |
| Val-V1 | 1 | ③ |
| indx | 2 | 4 |

| Mem-M4 | | |
|---|---|---|
| | Col-1 | Col-2 |
| Row-1 | 0 | 6 |
| Row-2 | 4 | -2 |
| Row-3 | 1 | 5 |
| Row-4 | -1 | 2 |
| Val-V1 | ③ | ③ |
| Prod 1 | 4 | -2 |
| Prod 2 | | |

FIG. 42

| Mem-V1 | | |
|---|---|---|
| | Col-1 | Col-2 |
| Val-V1 | 1 | 3 |
| indx | 2 | ④ |

| Mem-M4 | | |
|---|---|---|
| | Col-1 | Col-2 |
| Row-1 | 0 | 6 |
| Row-2 | 4 | -2 |
| Row-3 | 1 | 5 |
| Row-4 | -1 | 2 |
| Val-V1 | 3 | 3 |
| Prod 1 | 4 | -2 |
| Prod 2 | -3 | 6 |

FIG. 43

SPARSE MATRIX MULTIPLICATION IN ASSOCIATIVE MEMORY DEVICE

CROSS REFERENCE TO RELATED APPLICATIONS

This application is a continuation application of U.S. Ser. No. 15/873,002 filed Jan. 17, 2018, which application claims priority and benefit from U.S. provisional patent application 62/449,036, filed Jan. 22, 2017, both of which are incorporated herein by reference.

FIELD OF THE INVENTION

The present invention relates to associative memory devices generally and to a generally efficient method of multiplying sparse matrices in particular.

BACKGROUND OF THE INVENTION

Matrix multiplication (matrix product) produces a matrix C from two matrices A and B. If A is an n×m matrix and B is an m×p matrix, their matrix product AB is an n×p matrix, in which the m entries across a row of A are multiplied with the m entries down a column of B and summed to produce an entry of AB i.e. each i, j entry in the product matrix C is given by multiplying the entries $A_{ik}$ (across row i of A) by the entries $B_{kj}$ (down column j of B), for k=1, 2, ..., m, and summing the results over k according to equation 1:

$$AB_{ij} = \Sigma_{k=0}^{n} A_{ik} \times B_{kj} \quad \text{Equation 1}$$

Computing matrix products is a central operation in many algorithms and is potentially time consuming. Various algorithms have been developed for computing the multiplication especially for large matrices which provide a complexity of O(mnp).

Throughout this application, matrices are represented by capital letters in bold, e.g. A, vectors by lowercase letters in bold, e.g. a, and entries of vectors and matrices represented by italic fonts e.g. *A* and *a*. Thus, the i, j entry of matrix A is indicated by $A_{ij}$ and entry i of vector a is indicated by $a_i$.

In addition, throughout this application, the operands of the multiplications may be referred to as "multiplier" and "multiplicand" and the value of each operand may be originated at either a matrix or a vector.

SUMMARY OF THE PRESENT INVENTION

There is provided, in accordance with a preferred embodiment of the present invention, a method for use in an associative memory device when multiplying by a sparse matrix. The method includes storing only non-zero elements of the sparse matrix in the associative memory device as multiplicands. The storing includes locating the non-zero elements in computation columns of the associative memory device according to linear algebra rules along with their associated multiplicands such that a multiplicand and a multiplier of each multiplication operation to be performed are stored in a same computation column. The locating operation locates one of the non-zero elements in more than one computation column if the one of the non-zero elements is utilized in more than one multiplication operation.

Further, in accordance with a preferred embodiment of the present invention, the method includes concurrently in all computation columns, multiplying a multiplier value by its associated multiplicand value to provide a product in the computation column and adding together products from computation columns, associated according to a linear algebra rule, providing a resultant matrix.

There is also provided, in accordance with a preferred embodiment of the present invention, a system for use when multiplying by a sparse matrix in an associative memory device. The system includes an associative memory array arranged in rows and computation columns and a data organizer. The data organizer stores only non-zero elements of the sparse matrix in the associative memory device as multiplicands and locates the non-zero elements in computation columns of the associative memory device according to linear algebra rules along with their associated multiplicands such that a multiplicand and a multiplier of each multiplication operation to be performed are stored in a same computation column. The data organizer locates one of the non-zero elements in more than one computation column if the one of the non-zero elements is utilized in more than one multiplication operation.

Further, in accordance with a preferred embodiment of the present invention, the system also includes a multiplication unit to concurrently activate all computation columns, wherein the activation provides a product of a multiplication operation between a value of the multiplier and a value of the multiplicand in each computation column and an adder to concurrently add products in associated computation columns.

Moreover, in accordance with a preferred embodiment of the present invention, the multiplicands form a sparse matrix. Alternatively, the multiplicands form a dense vector.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a schematic illustration of the multiplication operation performed inside the memory array;

FIG. 8 is a schematic illustration of the sum operation performed inside the memory array;

FIG. 10 is a schematic illustration of two exemplary sparse matrices with their memory representation and the expected resultant matrix with its memory representation;

FIGS. 12-38 are schematic illustrations of the steps performed by the matrix multiplier system of FIG. 1 when multiplying two exemplary sparse matrices, according to the flow of FIG. 11;

FIGS. 40, 41, 42 and 43 are schematic illustrations of the steps performed by the matrix multiplier system of FIG. 1 when multiplying the sparse vector and the dense matrix of FIG. 39.

Figure 1:
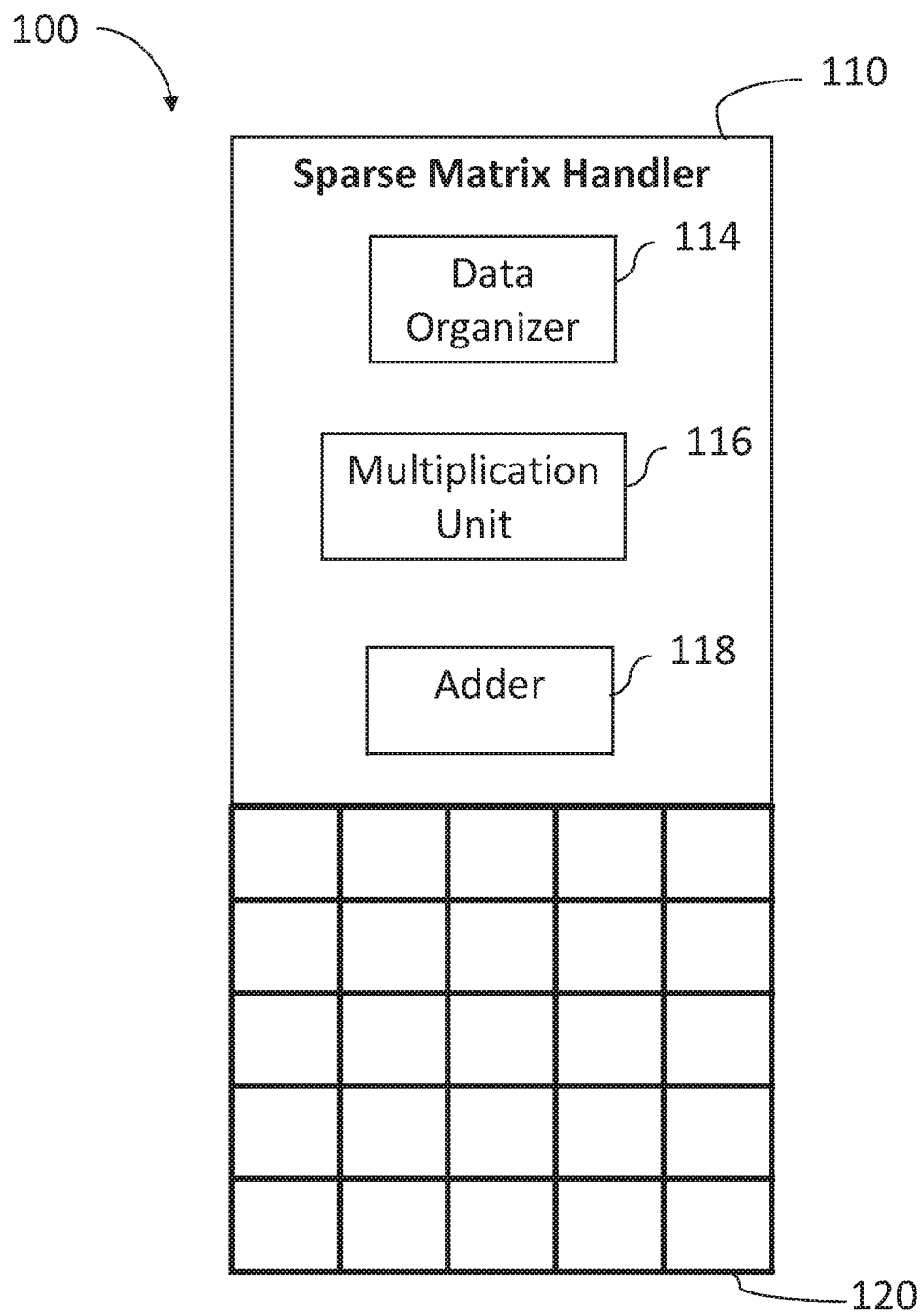
FIG. 1 is a schematic illustration of a matrix multiplier system, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that multiplication of a dense vector with a sparse matrix (i.e. a matrix with many entries which have a value of 0) may be done with a complexity of $O(n+\log \beta)$ in an associative memory, where $\beta$ is the number of non-zero elements in the sparse matrix and n is the size of the dense vector. When the dimension n is much smaller than the dimension m (n≪m), the complexity of the computation may be approximately $O(\log \beta)$, since n may be negligible, and the complexity does not depend on the large dimension m.

Applicant has also realized that multiplication of two sparse matrices (many entries in both matrices equal 0) may be done in a complexity of $O(\beta+\log \beta)$, where $\beta$ is the number of non-zero elements in the sparse matrix, and that multiplication of a sparse vector with a dense vector may be likewise efficiently performed.

Applicant has realized that, since only the non-zero elements in a matrix or a vector contribute to the result of the multiplication, only these elements need be stored in the associative array while still providing a correct result of the multiplication. Applicant has also realized that the non-zero elements of the matrices may be stored in computation columns according to linear algebra rules such that a multiplicand and a multiplier of each multiplication operation may be stored in the same computation column. It may be appreciated that a value from a matrix may be stored in multiple computation columns when used in more than one multiplication operation.

FIG. 1, to which reference is now made, is a schematic illustration of a matrix multiplier system 100, constructed and operative in accordance with a preferred embodiment of the present invention. Matrix multiplier system 100 comprises a sparse matrix handler 110 and an associative memory array 120. Sparse matrix handler 110 may comprise a data organizer 114, a multiplication unit 116 and an adder 118 to perform the computation defined in equation 1.

Associative memory array 120 may store the information needed to perform the multiplication and may be a multi-purpose associative memory device such as the ones described in U.S. Pat. No. 8,238,173 (entitled "USING STORAGE CELLS TO PERFORM COMPUTATION"); U.S. Patent Publication No. US-2015-0131383 (entitled "NON-VOLATILE IN-MEMORY COMPUTING DEVICE"); U.S. Pat. No. 9,418,719 (entitled "IN-MEMORY COMPUTATIONAL DEVICE"); U.S. Pat. No. 9,558,812 (entitled "SRAM MULTI-CELL OPERATIONS") and U.S. patent application Ser. No. 15/650,935, published as US 2017/0316829 and now issued as U.S. Pat. No. 10,153,042 (entitled "IN-MEMORY COMPUTATIONAL DEVICE WITH BIT LINE PROCESSORS") all assigned to the common assignee of the present invention and incorporated herein by reference.

Data organizer 114 may store any sparse matrix in several rows of associative memory array 120 such that only the non-zero elements are stored with an indication of their location in the original sparse matrix. One example of storage may be utilizing three rows of associative memory array 120, such that one row may be used to store the non-zero values of the matrix, one row may be used to store the column indices of the non-zero values and one row may be used to store the row indices of the non-zero values. Using this architecture, each non-zero element of the matrix may be stored in one column of associative memory array 120, which may also be referred to as a computation column; however, other ways to represent a sparse matrix in a computation column, such as via a column base and offset from the base representation and any other representation that provides the original position of the element in the matrix, may also be utilized.

Figure 2:
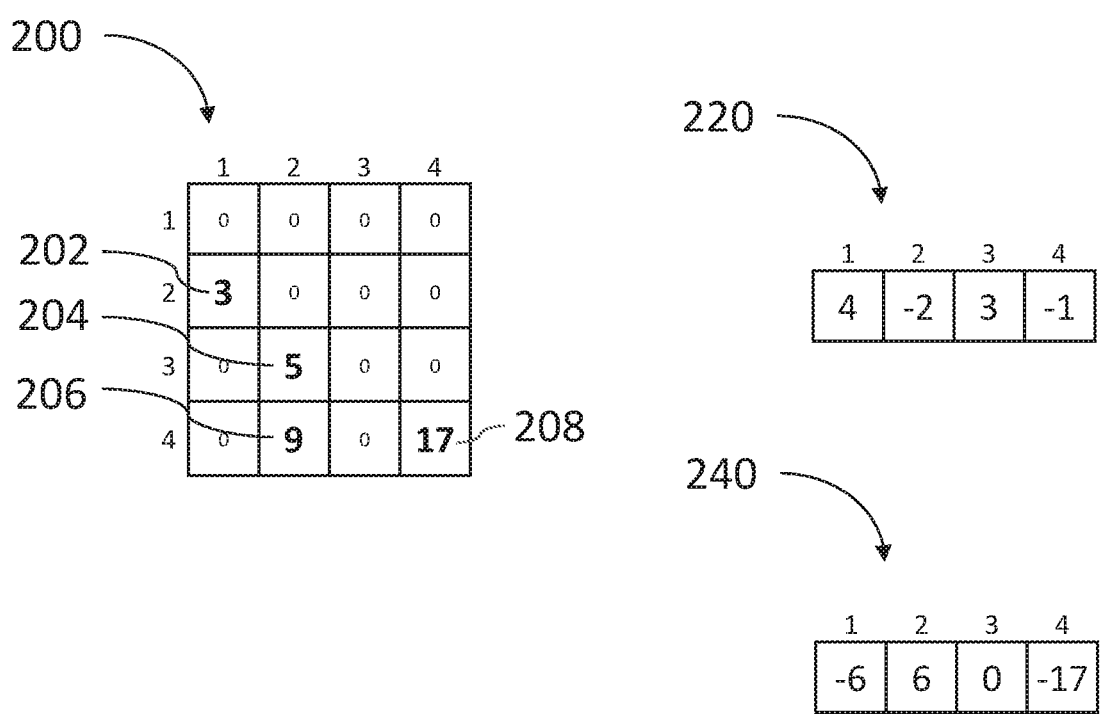
FIG. 2 is a schematic illustration of an exemplary sparse matrix, an exemplary dense vector and an exemplary result vector computed by the matrix multiplier system of FIG. 1.

Reference is now made to FIG. 2 which is a schematic illustration of an exemplary sparse matrix 200, an exemplary dense vector 220 and an exemplary result vector 240 storing the result of multiplying sparse matrix 200 by dense vector 220.

Sparse matrix 200 has four non-zero elements: element 202 having the value 3 stored in row 2, column 1 of matrix 200; element 204 having the value 5 stored in row 3, column 2 of matrix 200; element 206 having the value 9 stored in row 4, column 2 of matrix 200 and element 208 having the value 17 stored in row 4, column 4 of matrix 200. Dense vector 220 contains the value 4 in the first position, the value −2 in the second position, the value 3 in the third position and the −1 in the fourth position. It may be appreciated that the multiplication of dense vector 220 by sparse matrix 200 may be expressed by applying the values of the matrix and the vector on Equation 1 as follows:

$$4*0+-2*3+3*0+-1*0=-6$$

$$4*0+-2*0+3*5+-1*9=15-9=6$$

$$4*0+-2*0+3*0+-1*0=0$$

$$4*0+-2*0+3*0+-1*17=-17$$

Result vector 240 may contain the value −6 in the first position, the value 6 in the second position, the value 0 in the third position and the −17 in the fourth position.

Figure 3:
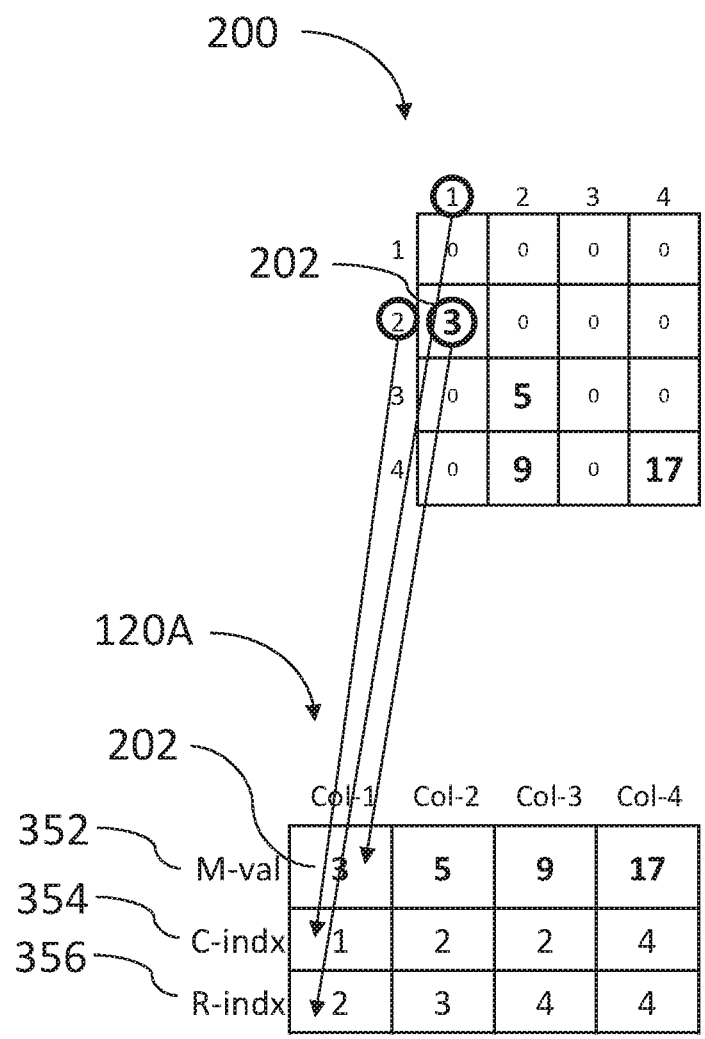
FIG. 3 is a schematic illustration of the arrangement of data, related to the sparse matrix, in the memory array.

Reference is now made to FIG. 3 which is a schematic illustration of an exemplary utilization of memory array 120 to perform the multiplication of the dense vector and the sparse matrix of FIG. 2.

Data organizer 114 may store each element of sparse matrix 200 in a computation column of memory array 120A in 3 rows as follows: a M-val row 352 may store the value of a non-zero element of matrix 200, a C-indx row 354 may store the column index of the non-zero element and a R-indx row 356 may store the row index of the non-zero element. For example, element 202 of matrix 200 is stored in computation column Col-1 of memory array 120A. The value of element 202, which is 3, is stored in Col-1 in M-val row 352. The column index of element 202, which is 1, is stored in Col-1 in C-indx row 354 and the row index of element 202, which is 2, is stored in a R-indx row 356.

Figure 4:
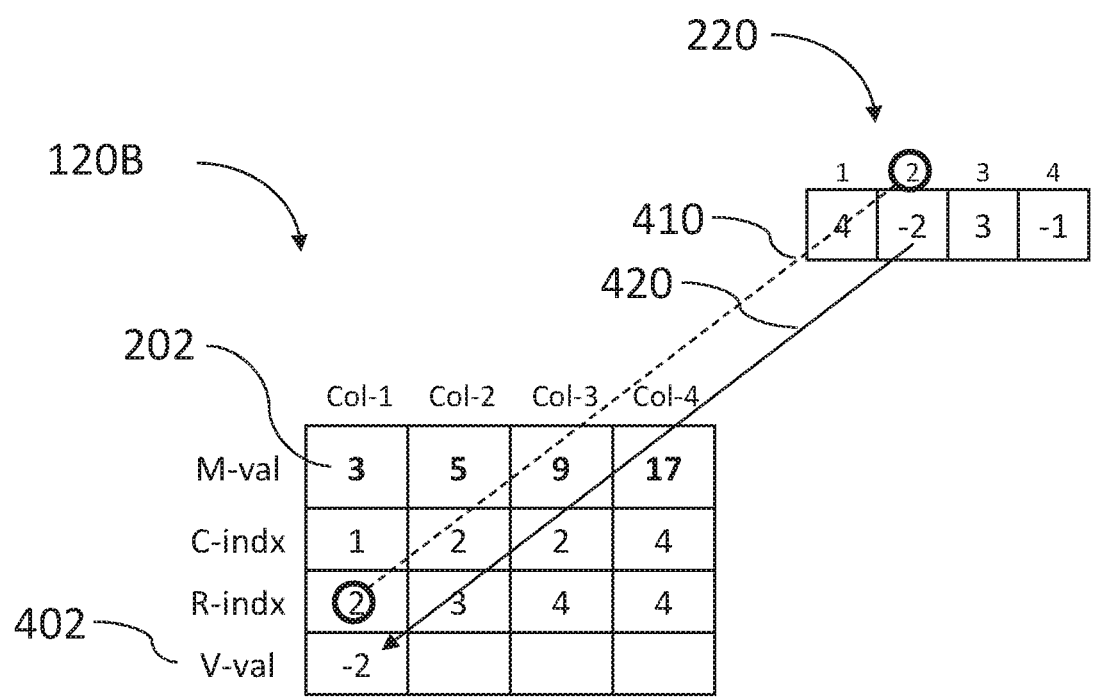
FIGS. 4, 5 and 6 are schematic illustrations of the arrangement of data, related to a dense vector, in the memory array.

Data organizer 114 may further store the dense vector in a row V-val 402 of memory array 120B as illustrated in FIG. 4 to which reference is now made. FIG. 4 illustrates all values of FIG. 3 with the additional row V-val. Data organizer 114 may distribute the data value of each row i of dense vector 220 to all computation columns of memory array 120B having the same row value i in their R-indx row.

First, data organizer 114 may look for the row value of 1 in each computation column Col-k of row R-indx. In the example, there are no computation columns Col-k having a value 1 in row R-indx. Next, data organizer 114 may look for the row value of 2 in each computation column Col-k of row R-indx. Data organizer 114 may identify Col-1 as having the value 2, as indicated by dashed line 410, and may write the data value, which is −2, into row V-val of computation column Col-1, as indicated by arrow 420.

Figure 5:
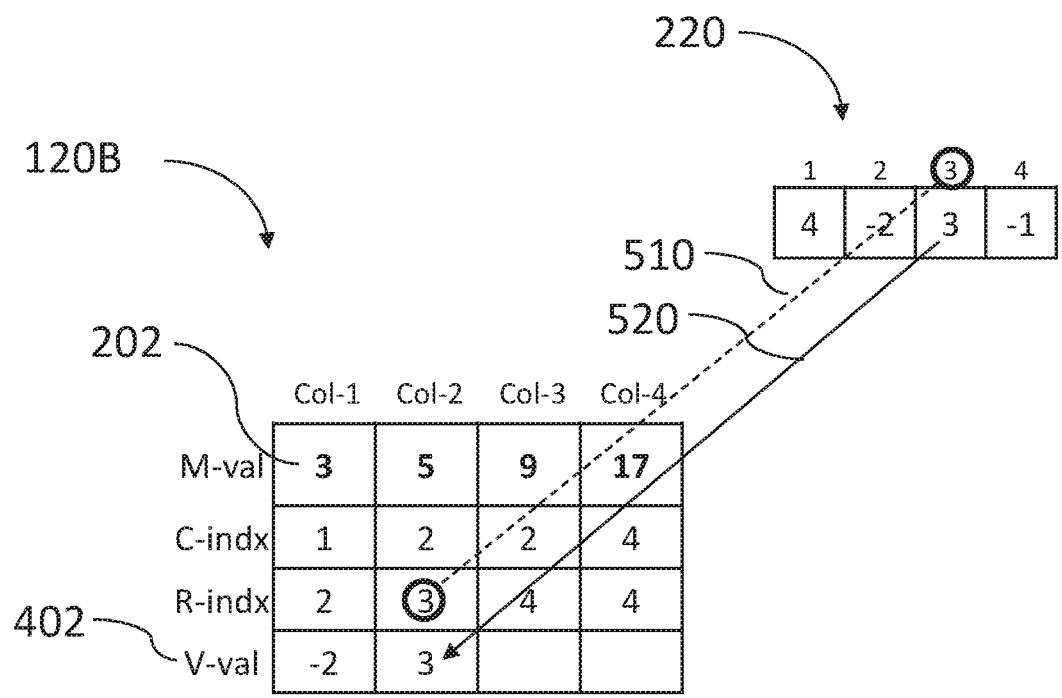
Figure 6:
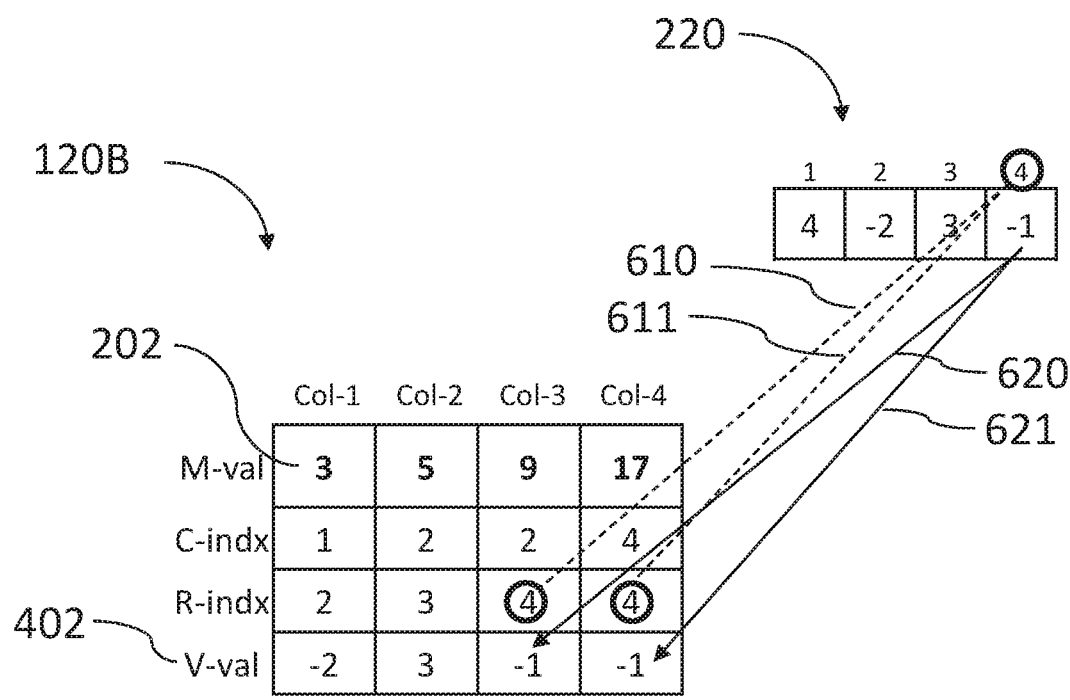

In FIG. 5, data organizer 114 may find the next row value, 3, in computation column Col-2, as indicated by dashed line 510 and may write the data value stored in the third location of dense vector 220 to Col-2 of row V-val, as indicated by arrow 520. Finally, in FIG. 6, data organizer 114 may find the next row value, 4, in both computation columns Col-3 and Col-4, as indicated by dashed lines 610 and 611 respectively, and may write the data value stored in the fourth location of dense vector 220 to computation columns Col-3 and Col-4 of row V-val, as indicated by arrows 620 and 621, respectively.

It will be appreciated that some data values are not present in the illustrations of all figures so as not to obscure the details of the operations; however, the values are present in memory array 120.

FIG. 7, to which reference is now made, is a schematic illustration of the multiplication operation. It may be appreciated that the multiplier and the multiplicand for each step of the vector matrix multiplication operation are stored in the same computation column of memory array 120C. Multiplication unit 116 (of FIG. 1) may concurrently, in all computation columns, multiply the value stored in M-val by the value stored in V-val, and store the result in a Prod row. The value stored in M-val of Col-1 is 3, the value stored in V-val of Col-1 is −2 and the multiplication result 3*(−2)= (−6) is stored in Prod row of Col-1. Similarly, in Prod row of Col-2, the value 5*3=15 is stored, in Prod row of Col-3, the value 9*(−1)=(−9) is stored and in Prod row of Col-4, the value 17*(−1)=(−17) is stored.

FIG. 8, to which reference is now made, is a schematic illustration of the sum operation done by adder 118 during the matrix vector multiplication operation described in equation 1. Adder 118 may sum all elements of Prod row for which the column value in row C-indx row is identical and may store the sum in an Out row of the corresponding column, i.e. adder 118 may search for all computation columns Col-k having the same column value j in row C-indx, may add the values stored in row Res of the corresponding columns and may store the result in row Out of Col-j.

Adder 118 may calculate the sum using shift and add operations done on the corresponding values belonging to the same column, i.e. having the same C-indx.

For example, the column value stored in row C-indx of both Col-2 and Col-3 is 2 (marked with circles), indicating that the values stored in the M-val row of these computation columns of associative memory array 120C originated from the same column of the original sparse matrix 200. According to equation 1, the multiplication results in the same column should be added; thus, adder 118 may write in Out row 802 of column Col-2 the sum of the Res values of the relevant columns.

Adder 118 may write the sum of all items which originated in each column of the sparse matrix 200 to the appropriate column in the Out row. In the example of FIG. 2, there is only one value in column 1 of sparse matrix 200 which is stored in Col-1 of associative memory array 120C. The value of −6 stored in Prod row of Col-1 is therefore copied as is to the Out row. Thus, adder 118 may copy the value from Prod row to Out row in those computation columns (such as columns 1 and 4) for whom there is only one column value in the C-indx row. Otherwise, adder 118 may add the result values for computation columns having the same column value in their C-indx row.

It may be appreciated that the Out row is the result of the multiplication of the sparse matrix by the dense vector.

Figure 9:
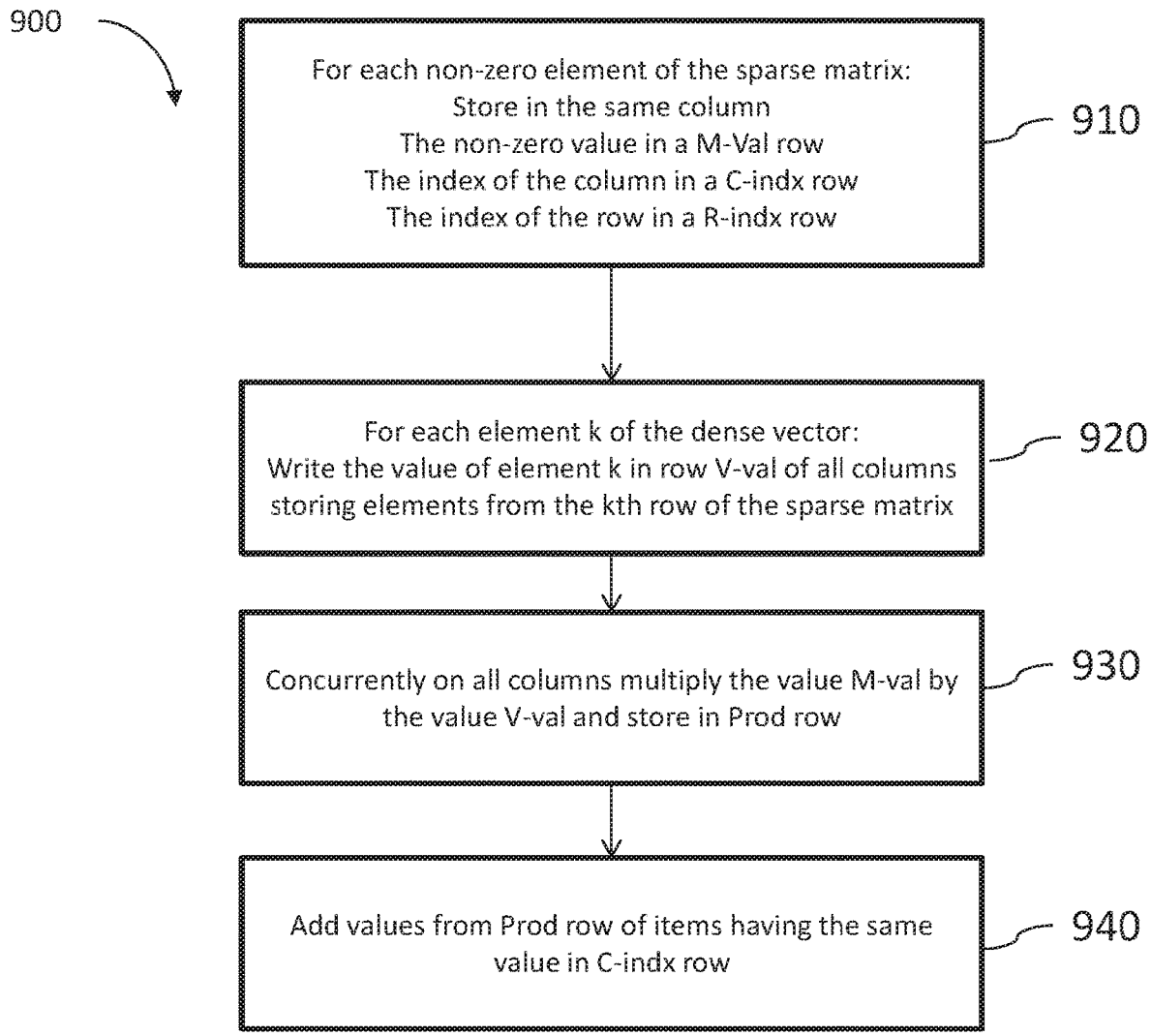
FIG. 9 is a schematic flow describing the operation of a matrix multiplier system of FIG. 1 for multiplying a sparse matrix with a dense vector.

FIG. 9, to which reference is now made, is a schematic flow 900 describing the operation of system 100 for multiplying a sparse matrix with a dense vector. In 910, for each non-zero element of the sparse matrix, data organizer 114 may store, in a same column, the following values: the non-zero value in a M-Val row, the column index of the value in the original matrix in a C-indx row and the row index in the original matrix in a R-indx row.

In step 920, data organizer 114 may write the data value of the kth element of the dense vector in row V-val of all columns storing elements from the kth row of the sparse matrix. In step 930, multiplication unit 116 may multiply, concurrently in all computation columns, the value of a multiplicand M-val by the value of a multiplier V-val and may store the result in Prod row. In step 940, adder 118 may add together the values stored in Prod row whose origin was from the same column in the sparse matrix, i.e. items having the same column value in row C-indx.

It may be appreciated by the skilled person that the steps shown in flow 900 are not intended to be limiting and that the flow may be practiced with more or less steps, or with a different sequence of steps, or each step having more or less functionality or any combination thereof.

It may also be appreciated that the technique of storing a single sparse matrix as described hereinabove when multiplying a sparse matrix by a dense vector may be utilized for multiplying two sparse matrices. FIG. 10, to which reference is now made, is a schematic illustration of two exemplary matrices M1 and M2 with their memory representation Mem-M1 and Mem-M2 and matrix M3 which is the expected result of the multiplication M3=M2*M1. Mem-M1 and Mem-M2 occupy rows and computation columns of memory array 120 of FIG. 1.

Figure 11:
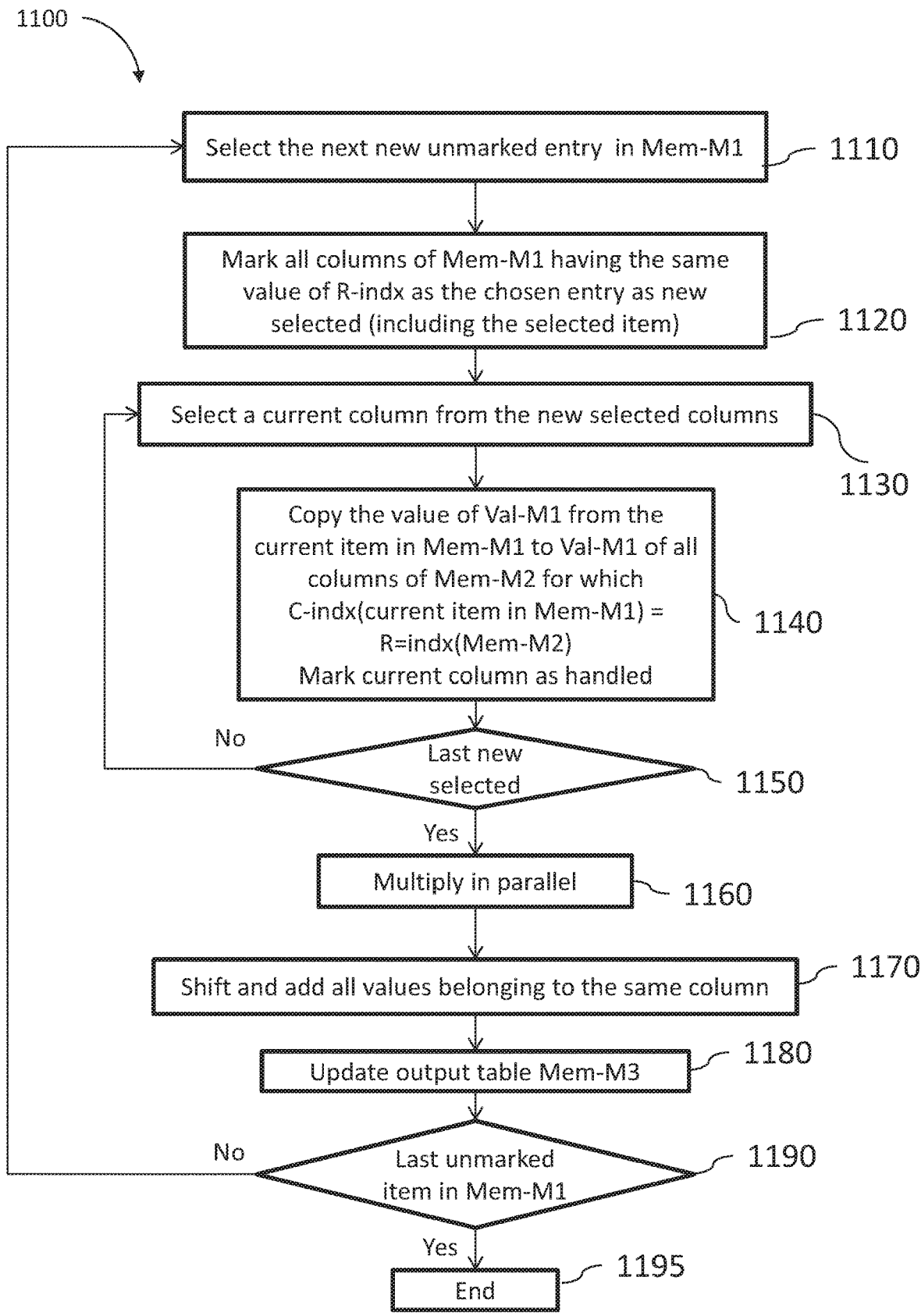
FIG. 11 is a schematic illustration of a flow describing the steps performed for multiplying two sparse matrices.

FIG. 11, to which reference is now made is, a schematic illustration of the flow 1100 with the steps performed for multiplying two sparse matrices M1 and M2 stored in memory array 120 in locations Mem-M1 and Mem-M2.

In step 1110, data organizer 114 may locate the next unmarked computation column in Mem-M1. In step 1120, data organizer 114 may mark all items of Mem-M1 having the same value of R-indx as the value in the located computation column. In step 1130 data organizer 114 may select one of the newly marked computation columns as a current computation column. In step 1140 data organizer 114 may copy the value of Val-M1 from the current computation column in Mem-M1 to Val-M1 of all computation columns of Mem-M2 having a value in R-indx which is equal to the value of C-indx of the current item in Mem-M1.

In step 1150 data organizer 114 may check to see if all newly selected items have been handled. If there are still unhandled items, data organizer 114 may return to step 1130. In step 1160 multiplication unit 116 may multiply in parallel the value of Val-M1 and the value of Val-M2 in Mem M2, providing the result of $M1_{ik} \times M2_{kj}$ of a row of M1 and a column of M2. In step 1170 adder 118 may add all the multiplication results providing the sigma of equation 1 and in step 1180 adder 118 may copy the result to an output table Mem-M3. In step 1190, data organizer 114 may check if all computation columns have been handled. If there are computation columns in Mem-M1 that are not marked as handled data organizer 114 may return to step 1110, otherwise, the operation may be completed in step 1195 and the resulting matrix M3 may be created from the information stored in Mem-M3 in a reverse operation of the one described with respect to FIG. 3 describing how a matrix is stored.

A pseudocode relevant to the flow of FIG. 11 is provided hereinbelow:

```
10)   Repeat for all unmarked entries in M1
20)      Choose next unmarked entry in M1
30)      Read its row index
40)      Mark all items of M1 having the same row index
50)      For all marked rows of M1
60)         Search M2 for which col(M1) = row(M2)
70)         Copy (distribute) selected value to output table bit lines
80)         Multiply in parallel
90)         Shift and add all values belonging to the same column
100)        Update output table
110)  Exit
```

The description of flow 1100, as well as the pseudocode is for exemplary purposes and the person skilled in the art may appreciate that the flow may be practiced with variations. These variations may include more steps, less steps, changing the sequence of steps, skipping steps, among other variations which may be evident to one skilled in the art.

The steps of multiplying two exemplary sparse matrices, according to Flow 1100 are schematically illustrated in FIGS. 12-36 to which reference is now made. In FIG. 12, data organizer 114 may find the next unmarked computation column in Mem-M1, which is Col-1. Next, in FIG. 13, data organizer 114 may read the value of R-indx of the found computation column, which is 1. Next, in FIG. 14, data organizer 114 may find all computation columns of Mem-M1 having the same value of R-indx as the value of R-indx of the found computation column and mark all these computation columns as new selected, including the found computation column.

In FIG. 15, data organizer 114 may select one of the marked computation columns, Col-1, as current and may read the value stored in the C-indx of Col-1 of Mem-M1, which is 2. In FIG. 16, data organizer 114 may find all computation columns in Mem-M2 having a value in R-indx identical to the value of C-indx in Col-1 of Mem-M1, which is only Col-1, and in FIG. 17, data organizer 114 may copy the value, which is 1, from Val-M1 of computation column Col-1 of Mem-M1 to Val-M1 of Col-1 of Mem-M2, and mark the current computation column (Col-1 in Mem-M1) as handled.

The operations described in FIGS. 13-17 are repeated until all marked items are handled, in this example these operations are repeated only one more time (as there are only two marked computation columns). In FIG. 18, data organizer 114 may find the next marked computation column, which is Col-4, and read the value from C-indx which is 4. In FIG. 19, data organizer 114 may find all computation columns of Mem-M2 having R-index=4, and in FIG. 20, data organizer 114 may copy Val-M1 from Col-4 of Mem-M1 to Val-M1 of Col-3 and Col-4 of Mem-M2 and mark Col-4 of Mem-M1 has handled.

In FIG. 21, multiplication unit 116 may concurrently multiply the value of Val-M1 by the value of Val-M2 of computation columns Col-1, Col-3 and Col-4 of Mem-M2 and may store in a Prod row of Mem-M2. It may be appreciated that if Mem-M2 contain multiple computation columns with the same value of C-indx, adder 118 may sum the value of the relevant computation columns and store the result in Out row of Mem-M2. In this example each multiplied computation column may have another value in the C-indx, thus the value in the Prod row is copied as is to the Out row.

In FIG. 22, multiplication unit 116 may copy the value C-indx and the results in the Out row of all computation columns being multiplied, i.e. Col-1, Col-3 and Col-4 of Mem-M2, and the value of R-indx from Mem-M1 (which is the same for all handled computation columns) to Mem-M3.

In FIGS. 23-38, the same procedure is repeated until all computation columns of Mem-M1 are handled and the final results are stored in Mem-M3 in FIG. 38. It may be appreciated that the resultant matrix is the expected matrix M3 of FIG. 10.

Figure 39:
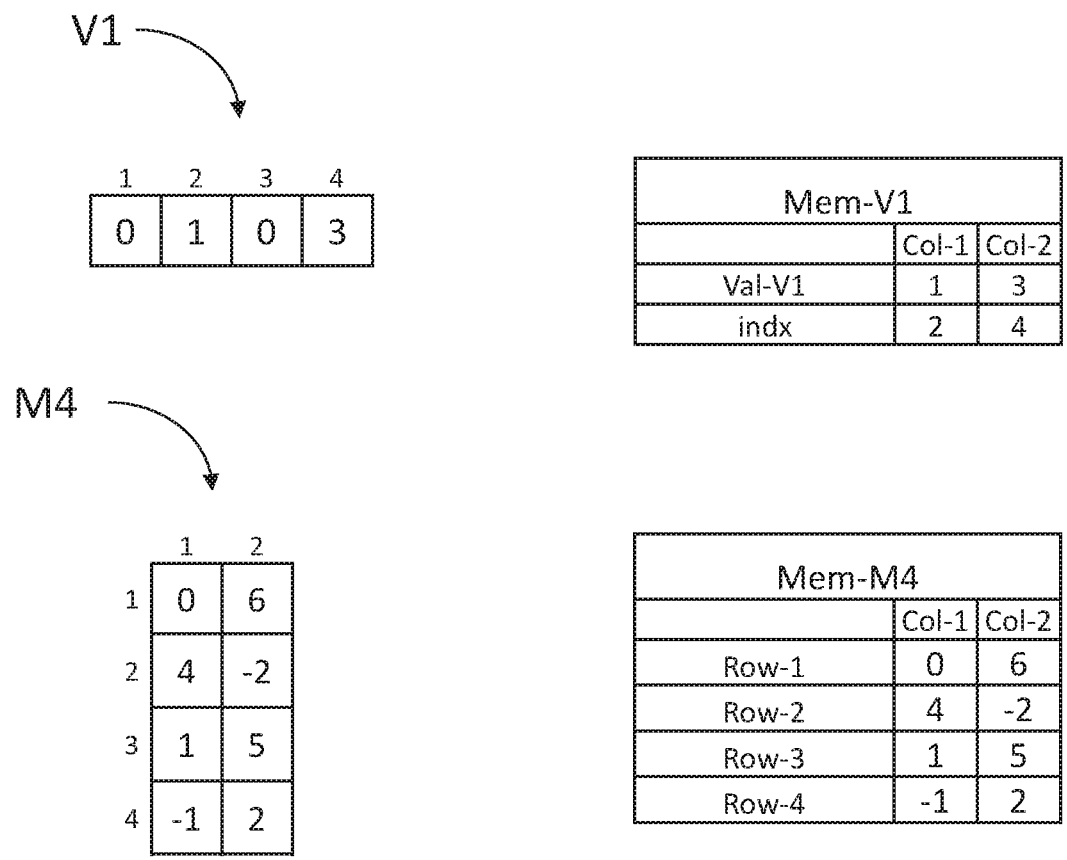
FIG. 39 is a schematic illustration of an exemplary sparse vector and an exemplary dense matrix with their memory representation.

It may be appreciated that a similar concept may be used for multiplying a dense matrix with a sparse vector as is illustrated in FIG. 39 to which reference is now made. Data organizer 114 may store all values of dense matrix M4 in Mem-M4 of associative memory 120 similar to their matrix representation. Data organizer 114 may store the value of non-zero elements of vector V1 in a row Val-V1 in associative memory 120 and their associated location in vector V1 in a row indx in associative memory 120.

Figure 40:
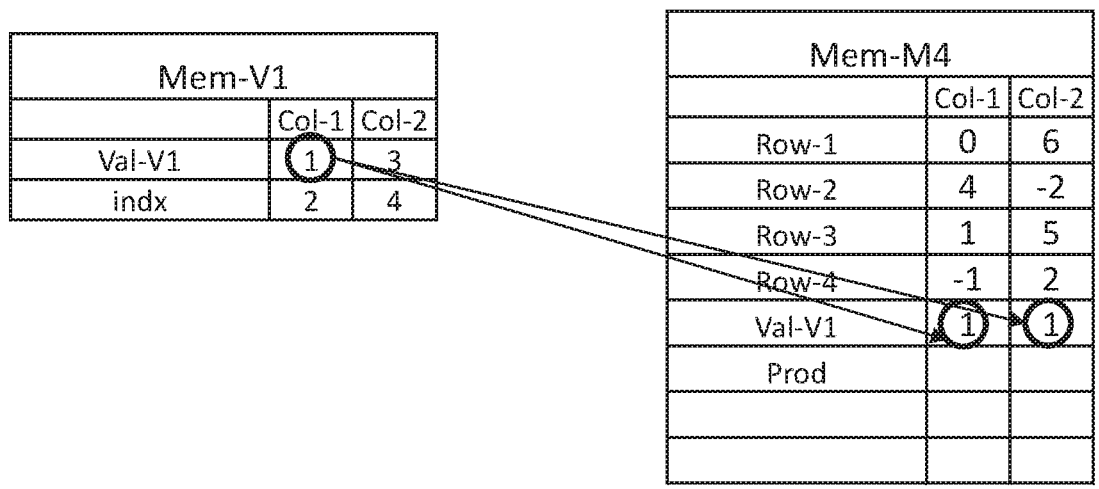

In FIG. 40 data organizer 114 may copy the first value of Mem-V1, which is 1 to all computation columns of Mem-M4 col-1 and col-2. In FIG. 41, multiplication unit 116 may read the value of indx row of the selected computation column of Mem-v1, which is 2, and may multiply the values stored in the relevant row, Row-2, of Mem-M4 with the values stored in row Val-V1 and may write the result to a row Prod-1 of Mem-M4.

In FIG. 42, data organizer 114 may copy the next value from Mem-V1, which is 3 to Val-V1 of Mem-M4 and in FIG. 43, multiplication unit 116 may read the value of indx row of the selected computation column of Mem-v1, which is 4, and may multiply the values stored in the relevant row, Row-4, of Mem-M4 with the values stored in row Val-V1 and adder 118 may add the result of the multiplication to the result of the previous step, therefore the values in row Prod of Mem-M4 are 4+(3×−1)=1 in Col-1 and −2+(3×2)=4 in Col-2 which provide the expected resultant vector in row Prod of Mem-M4.

It may be appreciated that in an alternative embodiment of the present invention multiplication unit 116 and adder 118 are the same component, performing concurrently a multiplication and an addition operation.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for use in an associative memory device when multiplying by a sparse matrix, the method comprising:

storing only non-zero elements of said sparse matrix in said associative memory device as multipliers, wherein said storing comprises:

locating said non-zero elements in computation columns of said associative memory device according to linear algebra rules along with their associated multiplicands such that a multiplicand and a multiplier of each multiplication operation to be performed are stored in a same computation column, said locating to locate one of said non-zero elements in more than one computation column if said one of said non-zero elements is utilized in more than one multiplication operation.

2. The method according to claim 1 and wherein said multiplicands form a sparse matrix.

3. The method according to claim 1 and wherein said multiplicands form a dense vector.

4. The method according to claim 1 and also comprising:
concurrently in all computation columns, multiplying a multiplier value by its associated multiplicand value to provide a product in said computation column; and
adding together products from computation columns, associated according to a linear algebra rule, providing a resultant matrix.

5. A system for use when multiplying by a sparse matrix in an associative memory device, the system comprising:

an associative memory array arranged in rows and computation columns; and a data organizer to store only non-zero elements of said sparse matrix in said associative memory device as multipliers, said data organizer to locate said non-zero elements in computation columns of said associative memory device according to linear algebra rules along with their associated multiplicands such that a multiplicand and a multiplier of each multiplication operation to be performed are stored in a same computation column, said data organizer to locate one of said non-zero elements in more than one computation column if said one of said non-zero elements is utilized in more than one multiplication operation.

6. The system according to claim 5 and wherein said multiplicands form a sparse matrix.

7. The system according to claim 5 and wherein said multiplicands form a dense vector.

8. The system according to claim 5 and also comprising:

a multiplication unit to concurrently activate all computation columns, wherein said activation provides a product of a multiplication operation between a value of said multiplier and a value of said multiplicand in each computation column; and an adder to concurrently add products in associated computation columns.

* * * * *